(12) United States Patent
Tang-Taye

(10) Patent No.: US 7,920,873 B2
(45) Date of Patent: Apr. 5, 2011

(54) ASSISTED METHOD OF LOCATING MOBILE COMMUNICATIONS TERMINALS OF A CELLULAR NETWORK USING A USSD TRANSPORT CHANNEL

(75) Inventor: Jacky Tang-Taye, Montfort l'Amaury (FR)

(73) Assignee: Alcatel, Paris (FR)

( * ) Notice: Subject to any disclaimer, the term of this patent is extended or adjusted under 35 U.S.C. 154(b) by 1201 days.

(21) Appl. No.: 11/041,385

(22) Filed: Jan. 25, 2005

(65) Prior Publication Data

US 2005/0164714 A1 Jul. 28, 2005

(30) Foreign Application Priority Data

Jan. 26, 2004 (FR) ...................................... 04 50134

(51) Int. Cl.
*H04W 24/00* (2009.01)
(52) U.S. Cl. .................... 455/456.1; 455/12.1; 455/13.1; 455/13.2; 455/404.1; 455/404.2; 455/456.2; 455/456.3; 455/456.4; 455/456.5; 455/456.6; 455/466
(58) Field of Classification Search .................. 455/12.1, 455/13.1, 13.2, 404.1, 456.1–456.6, 404.2, 455/466
See application file for complete search history.

(56) References Cited

U.S. PATENT DOCUMENTS

| | | | | |
|---|---|---|---|---|
| 5,841,396 A | * | 11/1998 | Krasner | 342/357.02 |
| 5,874,914 A | * | 2/1999 | Krasner | 342/357.12 |
| 5,883,594 A | * | 3/1999 | Lau | 342/357.1 |
| 5,917,444 A | * | 6/1999 | Loomis et al. | 342/357.12 |
| 6,121,923 A | * | 9/2000 | King | 342/357.12 |
| 6,295,454 B1 | * | 9/2001 | Havinis et al. | 455/456.3 |
| 6,400,319 B1 | * | 6/2002 | Castelloe et al. | 342/457 |
| 6,411,892 B1 | * | 6/2002 | van Diggelen | 701/207 |
| 6,813,500 B1 | * | 11/2004 | Ciganer et al. | 455/456.1 |
| 2002/0077116 A1 | * | 6/2002 | Havinis et al. | 455/456 |
| 2002/0102992 A1 | * | 8/2002 | Koorapaty et al. | 455/456 |

(Continued)

FOREIGN PATENT DOCUMENTS

EP 1 298 448 A1 4/2003

(Continued)

OTHER PUBLICATIONS

Rognerud Dagfinn, What is and how does GPS work?, Feb. 27, 2006. http://ezinearticles.com/?What-Is-and-How-Does-a—GPS-Work?&id=152814.*

(Continued)

*Primary Examiner* — Patrick N Edouard
*Assistant Examiner* — Shantell Heiber
(74) *Attorney, Agent, or Firm* — Sughrue Mion, PLLC

(57) ABSTRACT

A mobile communications terminal (T) for a cellular communications network comprises an assisted satellite positioning device (D) connected to a satellite positioning installation connected to an assistance data server, a USSD management module (MGT) for setting up USSD transport channels, and a processor (MT) for coupling the management module (MGT) to the device (D) on request in order for a USSD transport channel to be set up between the device (D) and a location management equipment of the cellular network connected to the assistance data server. The USSD channel is then used to send the device (D) assistance data representative of identifiers of at least three satellites visible in the cell in which the terminal (T) is situated so that it can lock onto said satellites to estimate at least the distances between the satellites and its terminal (T).

15 Claims, 1 Drawing Sheet

U.S. PATENT DOCUMENTS

Figure 1:
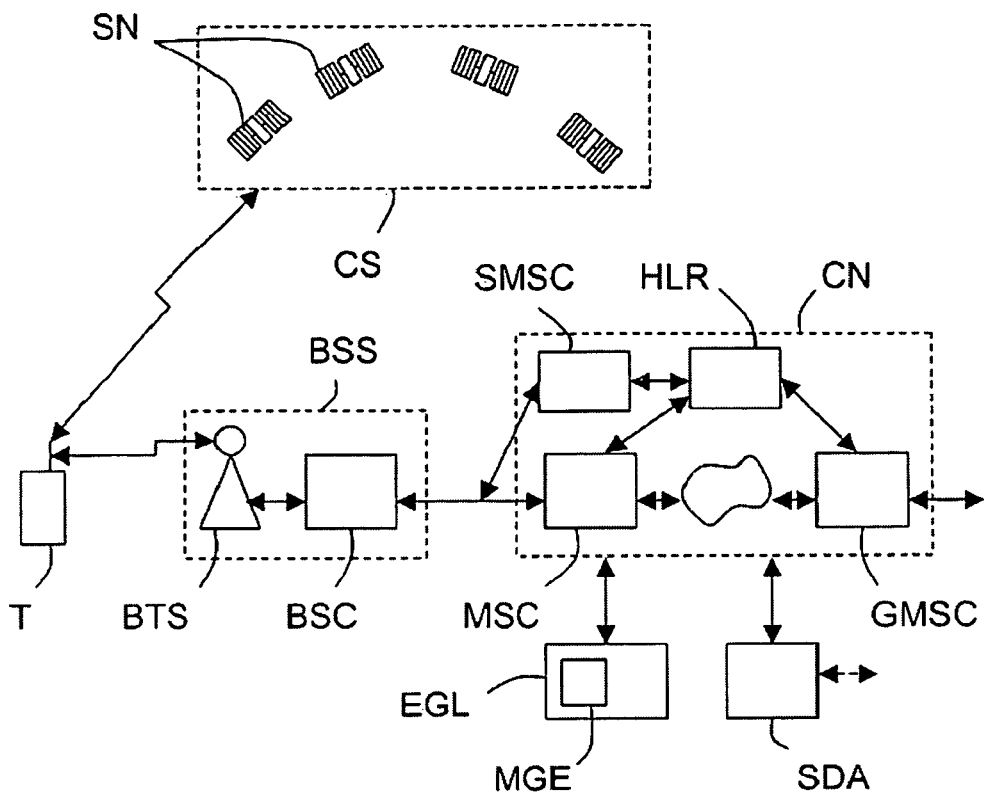

2005/0070223 A1* 3/2005 Camp et al. .................. 455/13.2

FOREIGN PATENT DOCUMENTS

| WO | WO 99/54753 | 10/1999 |
| WO | WO 00/10028 | 2/2000 |
| WO | WO 02/09465 A1 | 1/2002 |
| WO | WO 02/096138 A1 | 11/2002 |

OTHER PUBLICATIONS

Global Positioning System (GPS), website created 2003, http://www.nr6ca.org/gpsexplained.html.*

Langley Richard, In simple terms, how does GPS work?, Mar. 24, 2003, http://gge.unb.ca/Resources/HowDoesGPSWork.html.*

Harper et al., Process for improving GPS acquisition assistance data and server-side location determination for☐☐cellular networks, Nov. 15, 2004, http://www.gmat.unsw.edu.au/snap/publications/harper_etal2004.pdf☐☐.*

U.S. Appl. No. 11/041,403 filed Jan. 25, 2005, entitled Assisted Location through the Establishing of a Cellular Network Mobile Communication Terminal USSD Transport Channel, for a Call Centre.

* cited by examiner

ASSISTED METHOD OF LOCATING MOBILE COMMUNICATIONS TERMINALS OF A CELLULAR NETWORK USING A USSD TRANSPORT CHANNEL

The invention relates to cellular communications networks and more precisely to the use of satellites to locate mobile communications terminals thereof.

Some mobile communications terminals are equipped with a satellite positioning device enabling them to determine their position using navigation data supplied by a Radio Navigation Satellite Service (RNSS) type satellite positioning installation, for example the GPS network, the GLONASS network or the future GALILEO network.

In the present context, the expression "mobile terminal" means any communications terminal capable of exchanging data with a cellular network and equipped with a satellite positioning device that may be connected to a satellite positioning installation. Consequently, a mobile terminal may be a mobile telephone, a personal digital assistant (PDA) or a portable computer equipped with a radio communications interface, for example.

The person skilled in the art knows that for a positioning device to be able to determine the position of the terminal in which it is installed it must first successfully lock onto at least three and preferably four "visible" positioning satellites.

Locking on may take a relatively long time. It has therefore been proposed to connect satellite positioning installations to servers for supplying to satellite positioning devices (which are then referred to as "assisted" devices), on request, assistance data representative of the identifiers of the visible satellites in their respective cells. To be more precise, the assistance data server is supplied with the identifier of the cell in which the mobile terminal that is the subject of a location request is situated, which identifier is representative of its estimated position, in order for it to determine the satellites visible in that cell and to send their respective identifiers to the mobile terminal concerned, where applicable via a location management unit of its cellular network.

Locking on is greatly facilitated if an assisted satellite positioning device is in possession of the identifiers of the satellites visible from its mobile terminal.

Depending on the type of cellular network and/or the configuration of the mobile terminal, the cellular network may send the assistance data to the terminal concerned in circuit-switched mode, in short (SMS) messages, or in GPRS (General Packet Radio System) packets.

The circuit-switched mode of data transmission is slow and does not allow substantially simultaneous transfer of voice data and assistance data.

Sending SMS messages necessitates storage in a queue and is therefore relatively slow and also subject to unpredictable waiting times.

Finally, GPRS transmission does not allow substantially simultaneous transfer of voice data and assistance data, and may be envisaged only in 2.5 G networks such as GSM/GPRS networks.

Thus no prior art technique is entirely satisfactory, and an object of the invention is to improve on this situation.

To this end it proposes a method of locating mobile communications terminals each comprising an assisted satellite positioning device, adapted to be connected to a satellite positioning installation connected to an assistance data server.

The method is characterized in that, in the event of a location request from a mobile terminal:

it sets up a USSD transport channel between the assisted satellite positioning device of said terminal and a location management equipment of the parent cellular network of said terminal connected to said server, and it then sends the terminal via the USSD transport channel assistance data representative of identifiers of at least three (preferably four) satellites visible in the cell in which it is situated with the result that its assisted satellite positioning device can lock onto said satellites in order to estimate each distance between a visible satellite and its terminal.

The assisted satellite positioning device may determine the position of its terminal and, if the location request emanates from the network, data representative of that position is sent to the location management unit. Alternatively, the assisted satellite positioning device may determine only the distances between its terminal and the identified satellites, in which case the location management unit is sent data that is representative only of the terminal/satellite distances determined in this way, the location management unit then determining the position of the terminal, where applicable with the co-operation of the assistance data server.

If the location management unit is separate from the assistance data server, when the unit receives a location request it may send the server data representative of the identifier of the cell in which the terminal concerned is situated, in order for it to be able to determine the position of the cell and the corresponding assistance data from that identifier, after which it sends it the assistance data in order for it to send it to the terminal concerned via the USSD transport channel. Alternatively, the location management unit may also constitute the assistance data server. In this case, the unit determines the assistance data the from the identifier of the cell in which the terminal concerned is situated, after which it is sent to the terminal concerned via the USSD transport channel.

The location request may be generated either by the terminal or by a network equipment, where applicable by the location management unit. When the request is generated by the terminal, the data representative of the identifier of the cell is preferably contained in the location request, which is sent to the location management unit, whereas when the request is generated by the network equipment, the data is determined in the cellular network on receiving the location request (or when the request is generated locally).

Moreover, data is sent on the USSD transport channel in the form of dedicated end-to-end messages and in accordance with a user plane protocol, for example.

The invention also proposes a mobile communications terminal for a cellular communications network, comprising an assisted satellite positioning device adapted to be connected to a satellite positioning installation connected to an assistance data server.

The mobile terminal is characterized in that it comprises USSD management means able to set up USSD transport channels and processing means adapted to connect said USSD management means to said device on request in order for a USSD transport channel to be set up between said device and a location management equipment of said cellular network connected to said server. The USSD transport channel then enables sending to said device of assistance data representative of identifiers of at least three satellites visible in the cell in which said terminal is situated in order for it to be able to lock onto said satellites and then to estimate the distances between them and its terminal.

The assisted satellite positioning device may determine the position of its terminal. If the location request emanates from the network, the terminal then sends the location management unit data representative of its position via the USSD transport channel. Alternatively, if the assisted satellite positioning device determines only the distances between its terminal and the identified satellites, the terminal sends the location management unit data representative of those distances via the USSD transport channel.

The processing means may be adapted to supply the management means with data representative of the identifier of the cell in which their terminal is situated, so that it can be sent to the unit via the USSD transport channel for the purpose of determining assistance data.

The invention is particularly well suited, although not exclusively so, to 2G cellular communications networks such as GSM networks.

Figure 3:
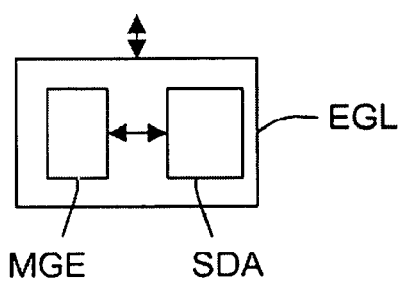
Figure 2:
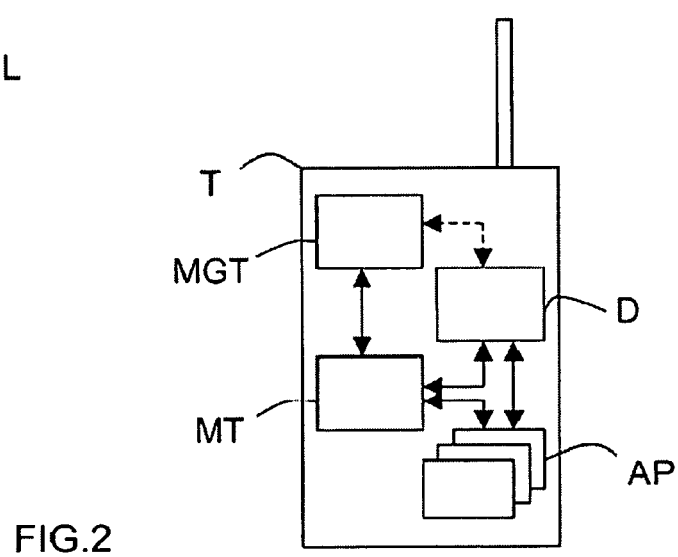

Other features and advantages of the invention will become apparent on reading the following detailed description and examining the appended drawings, in which:

FIG. 1 is a diagram of one embodiment of a GSM network connected to a location management centre and to an assistance data server of an assisted satellite positioning installation, FIG. 2 is a diagram of one embodiment of a location management centre incorporating an assistance data server of an assisted satellite positioning installation, and FIG. 3 is a functional diagram of one embodiment of a mobile terminal of the invention.

The appended drawings constitute part of the description of the invention as well as, if necessary, contributing to the definition of the invention.

An object of the invention is to facilitate the location of mobile communications terminals having parent cellular communications networks and connected to an assisted satellite positioning installation.

In the present context, the expression "assisted satellite positioning installation" means an installation comprising an RNSS (Radio Navigation Satellite System) type satellite positioning network, for example the GPS network, the GLO-NASS network or the future GALILEO network, or a combination of a least two of the above three networks, connected to an assistance data server for providing assistance data to facilitate computing the estimated position of mobile terminals or parameters needed for that position to be determined by assisted satellite positioning devices installed in said mobile terminals.

In the present context, the expression "mobile terminal" means any type of mobile terminal capable of exchanging data with a cellular communications network, in particular assistance data coming from the assistance data server, and capable of receiving signals containing navigation data from the satellite positioning system. Thus a mobile terminal may be a mobile telephone, a personal digital assistant (PDA) or a portable computer equipped with a radio communications interface, for example.

It is considered hereinafter, by way of example, that the assisted satellite positioning system is the A-GPS (Assisted-GPS) network and that the mobile terminals are mobile telephones equipped with an assisted satellite positioning device.

It is also considered hereinafter, by way of example, that the cellular communications network is a GSM network, as shown in FIG. 1. The invention relates to any other type of cellular network, of course, and in particular GSM/GPRS and UMTS networks (and all their equivalents).

The assisted satellite positioning installation comprising the GPS positioning network CS and the A-GPS assistance data server SDA (see FIG. 1) and its overall operation being entirely conventional, they are not described in more detail here. The operation of the GPS network CS and the operation of the associated A-GPS assistance data server SDA are therefore exactly the same as in the prior art. Suffice to say that, on request, the A-GPS server SDA delivers assistance data representative in particular of the identifiers of the navigation satellites SN that are visible in the cell in which the mobile terminal T to which the request relates is situated, derived from the estimated position of that cell (which is supplied by the network or by the mobile terminal T) and the current positions of the navigation satellites SN of the GPS network.

Additional information on the A-GPS network may be found on the website of the 3GPP (Third Generation Partnership Project) and to be more precise in Appendix D of the 3GPP document "Location Services (LCS): Functional Description Stage 2" (3GPP TS 03.71 V8.2.0).

Also, the parent GSM network of the mobile telephones T is entirely conventional. As shown in FIG. 1, it may be reduced to a radio access network BSS connected by an interface A to a core network CN (or NSS), which may in turn be connected to one or more other public and/or private networks.

The core network CN (or NSS) comprises firstly a mobile switching centre MSC connected to the interface A and carrying out the operations needed to manage circuit-mode communication with the mobile terminals T for which its network is the parent network. This mobile switching centre MSC may be connected to one or more other fixed or mobile networks via a GMSC (gateway MSC) switching gateway. The core network CN also comprises a short message switching centre SMSC connected to the interface A and carrying out the operations needed to manage messages, in particular SMS messages, with the mobile terminals T for which its network is the parent network. The core network CN further comprises a database called the home location register HLR containing information data on the mobile terminals T, both static data and dynamic data (their last known location or the position of the last cell in which they were situated). The MSC, SMSC and GMSC are all connected to the HLR so as to be able to obtain information on the mobile terminals needed for their respective processing tasks.

The A-GPS server SDA is generally connected directly or indirectly to the core network CN.

The radio access network BSS generally comprises a plurality of nodes or radio network controllers known as base station controllers BSC and connected to the core network CN via the interface A and a plurality of base transceiver stations BTS each associated with one or more cells each covering a radio coverage area and connected individually or in groups of at least two to one of the BSC via a logic interface called the Abis interface.

The invention further provides a location management equipment EGL, for example a service mobile location centre (SMLC), connected to the core network CN (or forming a portion thereof) and to the A-GPS server SDA via the GSM network, and whose function is explained hereinafter.

As mentioned above, an object of the invention is to facilitate the location of mobile terminals T having a parent cellular network and connected to an assisted satellite positioning installation (comprising the CS and the SDA).

To this end, it proposes to set up an unstructured supplementary service data (USSD) transport channel between the assisted positioning device D of the mobile telephone T and the location management equipment EGL each time a request is received to locate one of the mobile telephones T for which the GSM network is the parent network. Once the USSD channel has been set up, the mobile telephone T can be sent via this channel assistance data representative of the identifiers of at least three (preferably four) navigation satellites SN visible in the cell in which it is situated. The device D of the mobile telephone T can then lock onto the identified satellites much faster than in a non-assisted situation and estimate the distances between the satellites and its mobile telephone T, with a view to determining its position.

To use the invention, it is essential for the location management equipment EGL and the mobile telephone T each to be equipped with a respective USSD management module MGE, MGT, as shown in FIGS. 1 and 2.

Detailed information on the formalities of the USSD channels and the means needed to implement them can be found on the 3GPP website, and to be more precise in the 3GPP Technical Specifications TS 22.090 ("Unstructured Supplementary Service Data (USSD)"—Stage 1), TS 23.090 version 4.0.0 Release 4 ("Unstructured Supplementary Service Data (USSD)"—Stage 2), and TS 24.090 version 4.0.0 Release 4 ("Unstructured Supplementary Service Data (USSD)"—Stage 3).

On receiving a request to locate a mobile telephone T from the GSM network (or when it generates a request itself), the management module MGE of the equipment EGL initiates with the core network CN the setting up of a USSD transport channel between said equipment EGL and the device D of the mobile telephone T concerned. The mobile telephone T comprises a processing module MT that in particular, when the GSM network signals to it that an USSD transport channel must be set up between the equipment EGL and the device D of its mobile telephone T, sets up communication between the management module MGT and the device D in order for said management module MGT to set up a "connection" with the device D needed for the final setting up of the USSD transport channel between said device D and the equipment EGL. The various phases of initiating and setting up the USSD transport channel are effected by exchanging signaling messages in the conventional way.

If the location request emanates from the mobile telephone T, for example from one of its applications AP, each processing module MT sets up communication between its management module MGT and its device D in order for said management module MGT to set up a "connection" with the device D needed for setting up the USSD transport channel between said device D and the equipment EGL. The management module MGT and the core network CN then initiate the setting up of a USSD transport channel between the device D and the equipment EGL. The core network CN then signals to the management module MGT of the equipment EGL that a USSD transport channel must be set up between said equipment EGL and the device D of the telephone T concerned. The various phases of initiating and setting up the USSD transport channel are effected by exchanging signaling messages in the conventional way.

It is important to note that the A-GPS server SDA may be integrated into the location management equipment EGL, as shown in FIG. 3. In this configuration, the management module MGE can set up a "connection" with the A-GPS server, and it is therefore possible to consider that a USSD transport channel has been set up between a device D and the A-GPS server SDA.

Once the USSD transport channel between a device D and the equipment EGL or the A-GPS server SDA has been set up, it is possible to send said device D via the USSD transport channel data representative of the identifiers of the satellites SN that are visible in the cell in which its mobile telephone T is situated.

This requires a preliminary operation because it is necessary to communicate to the A-GPS server SDA the identifier of the cell in which the mobile telephone T is situated. The identifier may be supplied either by the mobile telephone T or by the network.

In the first case, the mobile telephone T determines the identifier of its cell internally and integrates it into the location request that it generates for sending to its processing module MT. When the processing module MT signals to the management module MGT that a USSD transport channel must be set up, it communicates the identifier of the cell to it in order for it to send it to the equipment EGL via said channel for that equipment in turn to communicate it to the A-GPS server SDA.

This data representative of the identifier of the cell is sent on the USSD transport channel in the form of dedicated end-to-end messages and in accordance with a proprietary user plane protocol. These dedicated USSD messages sent in accordance with a user plane protocol have the advantage of being independent of any audio communication set up between the mobile telephone T concerned and another communications terminal. They constitute a string of bytes, generally a maximum of 160 bytes, used to transfer characters, generally a maximum of 182 characters, as described in 3GPP Technical Specification TS 23.038 version 4.0.0 Release 4 "Alphabets and language-specific information".

On receiving the identifier of the cell, the A-GPS server SDA determines the corresponding location in an identifier/position database that is regularly updated by the cellular network.

In the second case, when the equipment EGL receives (or generates) a location request regarding a mobile telephone T, it determines within the GSM network, and to be more specific from the HLR, the identifier of the cell in which it is situated and sends that identifier to the A-GPS server SDA which then determines the corresponding location in the identifier/position database.

In either case, the A-GPS server SDA determines conventionally the identifiers of the satellites SN visible in the cell whose position it has just determined from the received identifier. It uses for this purpose the current positions of the satellites SN of the constellation CS of the GPS network, which it recovers from one or more reference receivers supplying information on the satellites in real time.

Once the identifiers have been determined, the A-GPS server SDA generates data that represents them and sends the data to the equipment EGL, which in turn sends the data to the device D via the USSD transport channel. Like any other transmission between the device D and the equipment EGL, this transmission takes the form of a dedicated USSD message and is in accordance with the user plane protocol.

When the device D receives the identifiers of the satellites SN visible in the cell in which its mobile telephone T is situated, it remains only to lock onto them in the conventional way (see above) to estimate the distance between it and four of them (at least three of them).

If the mobile telephone T includes an internal application AP needing its position at selected times, its assisted positioning device D generally determines each position for itself from the telephone/satellite distances that it has estimated. In this case, once the device D has estimated the telephone/satellite distances, it determines the position of the telephone T and communicates it to the internal application that has requested it.

When the location request comes from the GSM network, two situations may be envisaged: either the device D determines the position of its telephone T (this is called the "MS based" mode) or the device D does not estimate telephone/satellite distances (this is called the "MS assisted" mode).

In the MS based mode, once the device D has estimated the telephone/satellite distances, it determines the position of the telephone T and sends it to the equipment EGL via the USSD transport channel in the form of a dedicated USSD message and in accordance with the user plane protocol. The equipment EGL then uses this position internally or communicates it to the application (or equipment) of the GSM network that has requested it.

In the MS assisted mode, once the device D has the estimated telephone/satellite distances, it sends them to the equipment EGL via the USSD transport channel, in the form of a dedicated USSD message and in accordance with the user plane protocol. The equipment EGL then determines internally the position of the mobile telephone T concerned from the distances it has received or communicates the distances it has received to the A-GPS server SDA in order to enable the server to determine said position and then communicate the position to the telephone T. The equipment EGL then uses the position internally or communicates it to the application (or equipment) of the GSM network that has requested it.

Once a position has been determined, and where applicable sent to the GSM network, the USSD transport channel is eliminated.

Assistance data other than the identifiers of the visible satellites may be sent by the A-GPS server SDA to a device D either spontaneously or at the request of the device D if the data might be useful for determining telephone/satellite distances and/or the position of the telephone containing the device D.

The processing module MT, the USSD management modules MGT and MGE, and the assisted satellite positioning device D may take the form of electronic circuits, software (or data processing) modules, or a combination of circuits and software.

The invention is not limited to the embodiments of a mobile communications terminal and a location method described above by way of example only and encompasses all variants thereof that the person skilled in the art might envisage that fall within the scope of the following claims.

What is claimed is:

1. A method of locating mobile communications terminals (T) each comprising an assisted satellite positioning device (D), adapted to be connected to a satellite positioning installation (CS) connected to an assistance data server (SDA), which method is characterized in that, in the event of a location request from a mobile terminal (T), it sets up a USSD transport channel between the device (D) of said terminal and a location management equipment (EGL) of the parent cellular network of said terminal connected to said server (SDA) and then sends said terminal (T) via said USSD transport channel assistance data representative of identifiers of at least three satellites (SN) visible in the cell in which it is situated with the result that its device (D) locks onto said satellites (SN) in order to estimate each distance between a satellite and its terminal (T) with a view to determining the position of the terminal.

2. A method according to claim 1, characterized in that the device (D) determines the position of the terminal (T) in which it is installed.

3. A method according to claim 2, characterized in that, in the event of a location request from the network, said location management equipment (EGL) is sent data representative of said position that has been determined via said USSD transport channel.

4. A method according to claim 1, characterized in that the device (D) determines the distance between the terminal (T) in which it is installed and each of the identified satellites (SN) in order to send said location management equipment (EGL) via said USSD transport channel data representative of said distances, after which said location management equipment (EGL) determines the position of said terminal (T).

5. A method according to claim 1, characterized in that said location management equipment (EGL) is connected to said assistance data server (SDA) and, on reception of a location request, said equipment (EGL) sends said server (SDA) data representative of the identifier of the cell in which the terminal (T) concerned is situated, with the result that it determines said assistance data from that identifier and then communicates that data to said equipment (EGL) in order for it to send the data to said terminal (T) concerned via said USSD transport channel.

6. A method according to claim 5, characterized in that said location request is generated by said terminal (T) and includes said data representative of the identifier of the cell in which it is situated.

7. A method according to claim 5, characterized in that said data representative of the cell is supplied by the cellular network.

8. A method according to claim 1, characterized in that said location management equipment (EGL) constitutes said assistance data server (SDA) and said equipment (EGL) determines said assistance data from data representative of the identifier of the cell in which the terminal (T) concerned is situated in order to send the data to said terminal (T) concerned via said USSD transport channel.

9. A method according to claim 1, characterized in that data is transmitted on the USSD transport channel in the form of dedicated end-to-end messages and in accordance with a user plane protocol.

10. A mobile communications terminal (T) for a cellular communications network, comprising an assisted satellite positioning device (D) adapted to be connected to a satellite positioning installation (CS) connected to an assistance data server (SDA), the terminal being characterized in that it comprises USSD management means (MGT) adapted to establish USSD transport channels and processing means (MT) adapted to connect said USSD management means (MGT) to said device (D) on request in order for a USSD transport channel to be set up between said device and a location management equipment (EGL) of said cellular network connected to said server (SDA) to enable sending to said device via said USSD transport channel of assistance data representative of identifiers of at least three satellites (SN) visible in the cell in which said terminal (T) is situated in order for it to lock onto said satellites (SN) to determine the distances between them and its terminal (T).

11. A terminal according to claim 10, characterized in that said device (D) is adapted to determine the position of said terminal (T).

12. A terminal according to claim 11, characterized in that in the event of a location request from the cellular network said location management equipment (EGL) is sent data representative of said position that has been determined via said USSD transport channel.

13. A terminal according to claim 10, characterized in that it is adapted to send said location management equipment (EGL) via said USSD transport channel data representative of said distances between its terminal (T) and the identified satellites (SN).

14. A terminal according to claim 10, characterized in that said processing means (MT) are adapted to supply said management means (MGT) with data representative of the identifier of the cell in which said terminal (T) is situated for it to send the data to said equipment (EGL) via the USSD transport channel for the purpose of determining said assistance data.

15. A terminal according to claim 10, characterized in that said management means (MGT) are adapted to manage the sending of data on the USSD transport channel in the form of dedicated end-to-end messages and in accordance with a user plane protocol.

* * * * *